(12) United States Patent
Greschler et al.

(10) Patent No.: US 7,797,372 B2
(45) Date of Patent: *Sep. 14, 2010

(54) SERVING SOFTWARE APPLICATIONS FROM SERVERS FOR CLIENT COMPUTERS

(75) Inventors: David M. Greschler, Sharon, MA (US); Stuart Schaefer, Marblehead, MA (US)

(73) Assignee: Softricity, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/062,038

(22) Filed: Apr. 3, 2008

(65) Prior Publication Data

US 2008/0189361 A1    Aug. 7, 2008

Related U.S. Application Data

(63) Continuation of application No. 09/859,208, filed on May 16, 2001, now Pat. No. 7,370,071, which is a continuation-in-part of application No. 09/527,188, filed on Mar. 17, 2000, now Pat. No. 7,200,632.

(51) Int. Cl.
G06F 13/00    (2006.01)

(52) U.S. Cl. ........................................ 709/201

(58) Field of Classification Search .............. 709/201
See application file for complete search history.

(56) References Cited

U.S. PATENT DOCUMENTS

| | | | |
|---|---|---|---|
| 5,155,825 A | 10/1992 | Moughanni et al. | |
| 5,222,134 A | 6/1993 | Waite et al. | |
| 5,388,242 A | 2/1995 | Jewett | |
| 5,414,455 A | 5/1995 | Hooper et al. | |
| 5,442,390 A | 8/1995 | Hooper et al. | |
| 5,530,754 A | 6/1996 | Garfinkle | |
| 5,548,645 A | 8/1996 | Ananda | |
| 5,557,724 A | 9/1996 | Sampat et al. | |
| 5,572,643 A | 11/1996 | Judson | |
| 5,600,364 A | 2/1997 | Hendricks et al. | |
| 5,634,849 A | 6/1997 | Abecassis | |
| 5,642,417 A | 6/1997 | Stringer | |

(Continued)

FOREIGN PATENT DOCUMENTS

EP    0778512 A2    6/1997

(Continued)

OTHER PUBLICATIONS

Hewlett Packard 82153A "Mini Chess" (http://www.hpmuseum.org/software/41td/barcode/mchsil.pdf).*

(Continued)

*Primary Examiner*—Robert B Harrell
(74) *Attorney, Agent, or Firm*—Woodcock Washburn LLP

(57) ABSTRACT

An application serving system is disclosed that comprises a target client computer that connects to a server system and subscribing institution host Web Server, over a network. Both the client computer Web server and server system implement a network protocol layer to communicate across the network. In a preferred embodiment, network is the Internet, or other public or private network, and the network protocol layers are implemented on top of TCP/IP or UDP/IP. Other network configurations and network protocols layers, however, could be implemented in place or in addition to the Internet such as wireless CDPD, GPRS, or other networks. The target, client computer is preferably a PC.

16 Claims, 11 Drawing Sheets

U.S. PATENT DOCUMENTS

| | | |
|---|---|---|
| 5,644,718 A | 7/1997 | Belove et al. |
| 5,671,412 A | 9/1997 | Christiano |
| 5,673,316 A | 9/1997 | Auerbach et al. |
| 5,708,709 A | 1/1998 | Rose |
| 5,708,832 A | 1/1998 | Inniss et al. |
| 5,727,065 A | 3/1998 | Dillon |
| 5,737,619 A | 4/1998 | Judson |
| 5,745,678 A | 4/1998 | Herzberg et al. |
| 5,752,005 A | 5/1998 | Jones |
| 5,757,908 A | 5/1998 | Cooper et al. |
| 5,758,074 A | 5/1998 | Marlin et al. |
| 5,764,887 A | 6/1998 | Kells et al. |
| 5,765,152 A | 6/1998 | Erickson |
| 5,765,205 A | 6/1998 | Breslau et al. |
| 5,781,758 A | 7/1998 | Morley |
| 5,790,753 A | 8/1998 | Krishnamoorthy et al. |
| 5,793,966 A | 8/1998 | Amstein et al. |
| 5,805,804 A | 9/1998 | Laursen et al. |
| 5,809,145 A | 9/1998 | Slik et al. |
| 5,812,776 A | 9/1998 | Gifford |
| 5,826,014 A | 10/1998 | Coley et al. |
| 5,832,483 A | 11/1998 | Barker |
| 5,838,910 A | 11/1998 | Domenikos et al. |
| 5,850,352 A | 12/1998 | Moezzi et al. |
| 5,857,187 A | 1/1999 | Uenoyama et al. |
| 5,867,651 A | 2/1999 | Dan et al. |
| 5,867,667 A | 2/1999 | Butman et al. |
| 5,875,247 A | 2/1999 | Nakashima et al. |
| 5,889,860 A | 3/1999 | Eller et al. |
| 5,892,900 A | 4/1999 | Ginter et al. |
| 5,892,914 A | 4/1999 | Pitts |
| 5,892,954 A | 4/1999 | Tomas et al. |
| 5,900,871 A | 5/1999 | Atkin et al. |
| 5,915,119 A | 6/1999 | Cone |
| 5,919,247 A | 7/1999 | Van Hoff et al. |
| 5,920,864 A | 7/1999 | Zhao |
| 5,925,100 A | 7/1999 | Drewry et al. |
| 5,928,330 A | 7/1999 | Goetz et al. |
| 5,930,792 A | 7/1999 | Polcyn |
| 5,931,901 A | 8/1999 | Wolfe et al. |
| 5,937,164 A | 8/1999 | Mages et al. |
| 5,940,840 A | 8/1999 | Eshel et al. |
| 5,941,908 A | 8/1999 | Goldsteen et al. |
| 5,941,954 A | 8/1999 | Kalajan |
| 5,941,959 A | 8/1999 | Fishler et al. |
| 5,944,789 A | 8/1999 | Tzelnic et al. |
| 5,948,062 A | 9/1999 | Tzelnic et al. |
| 5,953,005 A | 9/1999 | Liu |
| 5,956,483 A | 9/1999 | Grate et al. |
| 5,971,277 A | 10/1999 | Cragun et al. |
| 5,978,828 A | 11/1999 | Greer et al. |
| 5,987,523 A | 11/1999 | Hind et al. |
| 5,991,399 A | 11/1999 | Graunke et al. |
| 5,991,402 A | 11/1999 | Jia et al. |
| 6,002,853 A | 12/1999 | De Hond et al. |
| 6,002,872 A | 12/1999 | Alexander, III et al. |
| 6,006,251 A | 12/1999 | Toyouchi et al. |
| 6,006,252 A | 12/1999 | Wolfe |
| 6,006,328 A | 12/1999 | Drake |
| 6,009,543 A | 12/1999 | Shavit |
| 6,012,090 A | 1/2000 | Chung et al. |
| 6,038,601 A | 3/2000 | Lambert et al. |
| 6,044,471 A | 3/2000 | Colvin |
| 6,052,780 A | 4/2000 | Glover |
| 6,055,572 A | 4/2000 | Saksena |
| 6,061,349 A | 5/2000 | Coile et al. |
| 6,065,043 A | 5/2000 | Domenikos et al. |
| 6,065,117 A | 5/2000 | White |
| 6,067,585 A | 5/2000 | Hoang |
| 6,067,622 A | 5/2000 | Moore |
| 6,070,009 A | 5/2000 | Dean et al. |
| 6,076,115 A | 6/2000 | Sambamurthy et al. |
| 6,078,951 A | 6/2000 | Pashupathy et al. |
| 6,085,185 A | 7/2000 | Matsuzawa et al. |
| 6,088,718 A | 7/2000 | Altschuler et al. |
| 6,088,796 A | 7/2000 | Cianfrocca et al. |
| 6,098,056 A | 8/2000 | Rusnak et al. |
| 6,098,067 A | 8/2000 | Erickson |
| 6,101,549 A | 8/2000 | Baugher et al. |
| 6,108,420 A | 8/2000 | Larose et al. |
| 6,108,703 A | 8/2000 | Leighton et al. |
| 6,112,239 A | 8/2000 | Kenner et al. |
| 6,115,741 A | 9/2000 | Domenikos et al. |
| 6,119,108 A | 9/2000 | Holmes et al. |
| 6,119,165 A | 9/2000 | Li et al. |
| 6,125,352 A | 9/2000 | Franklin et al. |
| 6,138,158 A | 10/2000 | Boyle et al. |
| 6,138,162 A | 10/2000 | Pistriotto et al. |
| 6,141,684 A | 10/2000 | McDonald et al. |
| 6,151,643 A | 11/2000 | Cheng et al. |
| 6,154,878 A | 11/2000 | Saboff |
| 6,158,010 A | 12/2000 | Moriconi et al. |
| 6,163,806 A | 12/2000 | Viswanathan et al. |
| 6,167,567 A | 12/2000 | Chiles et al. |
| 6,169,805 B1 | 1/2001 | Dunn et al. |
| 6,169,976 B1 | 1/2001 | Colosso |
| 6,199,048 B1 | 3/2001 | Hudetz et al. |
| 6,199,113 B1 | 3/2001 | Alegre et al. |
| 6,202,056 B1 | 3/2001 | Nuttall |
| 6,212,560 B1 | 4/2001 | Fairchild |
| 6,212,564 B1 | 4/2001 | Harter et al. |
| 6,216,173 B1 | 4/2001 | Jones et al. |
| 6,226,618 B1 | 5/2001 | Downs et al. |
| 6,226,680 B1 | 5/2001 | Boucher et al. |
| 6,240,401 B1 | 5/2001 | Oren et al. |
| 6,240,442 B1 | 5/2001 | Domenikos et al. |
| 6,247,013 B1 | 6/2001 | Morimoto |
| 6,249,528 B1 | 6/2001 | Kothary |
| 6,272,673 B1 | 8/2001 | Dale et al. |
| 6,279,001 B1 | 8/2001 | DeBettencourt et al. |
| 6,282,573 B1 | 8/2001 | Darago et al. |
| 6,292,833 B1 | 9/2001 | Liao et al. |
| 6,295,639 B1 | 9/2001 | Van Der Meer |
| 6,324,578 B1 | 11/2001 | Cox et al. |
| 6,327,658 B1 | 12/2001 | Susaki et al. |
| 6,334,189 B1 | 12/2001 | Granger et al. |
| 6,335,138 B1 | 1/2002 | Kurose et al. |
| 6,356,863 B1 | 3/2002 | Sayle |
| 6,360,366 B1 | 3/2002 | Heath et al. |
| 6,367,012 B1 | 4/2002 | Atkinson et al. |
| 6,374,402 B1 | 4/2002 | Schmeidler et al. |
| 6,385,596 B1 | 5/2002 | Wiser et al. |
| 6,389,462 B1 | 5/2002 | Cohen et al. |
| 6,405,111 B2 | 6/2002 | Rogers et al. |
| 6,412,009 B1 | 6/2002 | Erickson et al. |
| 6,421,726 B1 | 7/2002 | Kenner et al. |
| 6,421,781 B1 | 7/2002 | Fox et al. |
| 6,434,620 B1 | 8/2002 | Boucher et al. |
| 6,442,538 B1 | 8/2002 | Nojima |
| 6,453,334 B1 | 9/2002 | Vinson et al. |
| 6,453,353 B1 | 9/2002 | Win et al. |
| 6,471,068 B1 | 10/2002 | Kido et al. |
| 6,502,137 B1 | 12/2002 | Peterson et al. |
| 6,546,554 B1 | 4/2003 | Schmidt et al. |
| 6,572,661 B1 | 6/2003 | Stern |
| 6,578,199 B1 | 6/2003 | Tsou et al. |
| 6,643,775 B1 | 11/2003 | Granger et al. |
| 6,668,325 B1 | 12/2003 | Collberg et al. |
| 6,711,622 B1 | 3/2004 | Fuller et al. |
| 6,732,106 B2 | 5/2004 | Okamoto et al. |
| 6,763,370 B1 | 7/2004 | Schmeidler et al. |
| 6,771,290 B1 | 8/2004 | Hoyle |
| 6,782,478 B1 | 8/2004 | Probert |
| 6,816,544 B1 | 11/2004 | Bailey et al. |

| | | | |
|---|---|---|---|
| 6,868,495 | B1 | 3/2005 | Glover |
| 6,938,096 | B1 | 8/2005 | Greschler et al. |
| 7,010,697 | B2 | 3/2006 | Byrne et al. |
| 7,017,188 | B1 | 3/2006 | Schmeidler et al. |
| 7,100,192 | B1 | 8/2006 | Igawa et al. |
| 7,185,073 | B1 | 2/2007 | Gai et al. |
| 7,200,632 | B1 | 4/2007 | Greschler et al. |
| 7,225,264 | B2 | 5/2007 | Croman et al. |
| 7,370,071 | B2 | 5/2008 | Greschler et al. |
| 2001/0043215 | A1 | 11/2001 | Middleton, III et al. |
| 2002/0156911 | A1 | 10/2002 | Croman et al. |
| 2005/0010670 | A1 | 1/2005 | Greschler et al. |
| 2005/0021613 | A1 | 1/2005 | Schmeidler et al. |
| 2006/0129496 | A1 | 6/2006 | Chow et al. |
| 2006/0259949 | A1 | 11/2006 | Schaefer et al. |
| 2006/0272023 | A1 | 11/2006 | Schmeidler et al. |

FOREIGN PATENT DOCUMENTS

| | | |
|---|---|---|
| EP | 0866591 | 9/1998 |
| WO | WO 97/14251 | 4/1997 |
| WO | WO 97/42762 | 11/1997 |
| WO | 9807085 A1 | 2/1998 |
| WO | WO 99/27460 | 6/1999 |
| WO | WO 99/45491 | 9/1999 |
| WO | WO 0046685 | 8/2000 |
| WO | WO 01/79971 | 10/2001 |

OTHER PUBLICATIONS

Domel, "Mobile Telescript Agents and the Web," Digest of Papers of the Computer Society Computer Conference Compcon, US, los Alamitos, IEEE Computer Society Press, vol. Conf. 41, Feb. 1996, pp. 52-57.

Evans et al., "Using Java Applets and Corba for Multi-User Distributed Applications," IEEE Internet computing, US, vol. 1, No. 3, 1997, pp. 43-55.

Peng, "An Assessment of the Development of Internet GIS," URISA, 1997.

Unknown, "Helpers and Plug-Ins," Yale University Jan. 1997, US.

Edwards, "Network Client and Workstation Concerns," printed from http://windowsitlibrary.com/Content/121/08/4.html., Dec. 1997, pp. 1-2.

Chandra Krintz et al., Reducing Transfer Delay Using Java Class File Splitting and Prefetching, Proceedings of 14th SIPLAN conference on Object-oriented programming, systems, languages, and applications, Nov. 1999, pp. 276-290.

Harn, L. et al. A Software Authentification System for Information Integrity. Computers & Security 11, 747-752 (Dec. 1992).

Hauptmann, S. & Wasel, J. On-line Maintenance with On-the-fly Software Replacement. IEEE 70-71-80 (Aug. 1996).

Higaki, H. Extended Group Communication Algorithm for Updating Distributed Programs. IEEE 386-393 (Jun. 1996).

IBM & NEC to Cooperate in Establishing Common Standard to Prevent Illegal Copying of Digital Video Discs. Business Wire (Jul. 15, 1998).

IBM Announces Ground-Breaking Rights Management and Secure Payment Technology to Bring Leading Commercial Content Online, Business Wire (Oct. 31, 1995).

International Search report, Jul. 6, 2000, PCT/US99/27113.

James Griffioen et al., Automatic Prefetching in WAN. In IEEE Workshop on Advances in Parellel and Distributed Systems, Oct. 1993, pp. 8-12.

Miller, G. Firms Agree on Digital Anti-Piracy Technology. L.A. Times 117, p. A1 (Feb. 19, 1998).

New Anti Digital Copying Techniques Being Developed. Telecomworldwide (Sep. 5, 1997).

Rubin, D. Aviel; "Secure Distribution of Electronic Documents in a Hostile Environment", Computer Communications, NL, Elsevier Science Publishers BV, Amsterdam, vol. 18, No. 6 pp. 429-434 (Jun. 1, 1995).

* cited by examiner

APPLICATION MONITORING PROCESS (1/3)

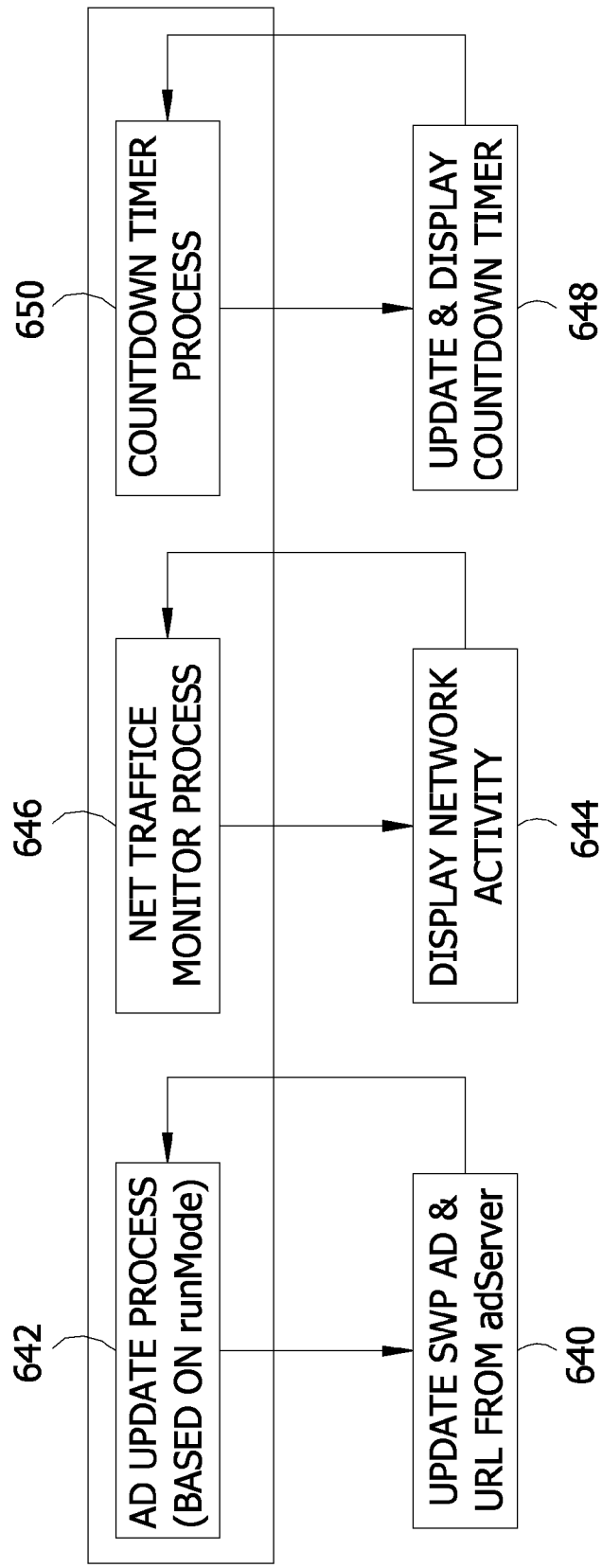

SERVING SOFTWARE APPLICATIONS FROM SERVERS FOR CLIENT COMPUTERS

This application is a continuation of U.S. patent application Ser. No. 09/859,208 filed May 16, 2001, now U.S. Pat. No. 7,370,071 which is a continuation-in-part of U.S. patent application Ser. No. 09/527,188 filed Mar. 17, 2000, now U.S. Pat. No. 7,200,632 the entire contents of which are herein incorporated by reference in their entireties.

BACKGROUND OF THE INVENTION

Internet or network delivery of application-program-style functionality has become increasingly important. The ubiquitous client-server platform typically requires that the front-end application program code be loaded and installed on the client computers. This requirement, however, is viewed as substantially increasing the installation and maintenance costs associated with computer networks. Moreover, many client operating system platforms are deemed unstable. Web delivery of applications programs would enable the code to be completely maintained on the server-side.

Additionally, there are a number of different business models that are pulling for network delivery of application program functionality. First, it can be used in software sales. A web-based software-sales institution can utilize the Internet, or other public network, to allow customers to "test-drive" the programs and thereby drive sales. A second justification for deployment arises in the thin client/network computer model where the code required for the application-level functionality and user data reside on the server side. In this situation, when the application functionality is required at the thin client, it is provided by the server on an as-needed basis. These servers can even be off-site in an application service provider (ASP) environment. Another justification surrounds the possibility to "rent" programs to users. A large number of potential users may have only limited requirements for certain classes of application programs. Their individual requirements may not justify investment in the typically expensive programs or not justify the costs of client installation. The thought here is to enable these users to rent access to the application programs, preferably via the Internet, to generate new revenue streams for the application software companies. Also, software vendors are becoming more flexible in the terms offered for licensing their software. Servers and clients need to participate in supporting flexible licensing modes, potentially even if the software being licensed does not internally support it.

One solution to providing application program functionality to the client computer via the network involves expanding the functionality of the browser. For example, the term "plug-in" is used to describe a browser code extension. ActiveX and Java are two of the most common extension platforms for the browser.

While the solution to provide application program functionality via the browser is attractive in its simplicity, a number of problems exist under current technology. First, providing sophisticated ActiveX and/or Java functionality is still in its infancy and largely unproven. Further, it ignores the wealth of existing, stable application programs that have been written and are being written to run directly on the operating systems, such as Windows 95/98/NT/2000, Unix, Linux, and Mac OS's.

Related, but limited, solutions attempt to allow potential buyers, for example, to "test drive" the program over the Internet. Typically, one of two techniques have been used. First, the selling institution may allow the potential owner to download a trial-version of the program. This version may have reduced capabilities and/or a limited lifetime. That is, the program is disabled after it has been invoked a set number of times, or after a specified date. Moreover, the process is complex, creating difficulty, often requiring a multi-step process in which the user must accept a download, pick a save as location, watch a download, quit the browser, find the file on the hard drive, run an installer, etc. Another technique is to extend the potential purchaser's browser in some fashion. For example, a demonstration application, often unrelated to the original in terms of application code, can be downloaded that mimic's the operation or graphical user interface of the application program. The problem here, however, is coding these applets can be difficult and/or time consuming and the experience is typically inferior to that offered by the "real" version of the application program.

Systems have been proffered to allow complete use of an application in a restricted mode or under licensing which requires a server to "unlock" the application for a client computer. Most of these systems have only dealt with the problem of restriction of the general license, leaving the problem of distribution unsolved.

Against this backdrop, most modern operating systems allow for the execution of code that is stored remotely from the client computer. The systems allow a client computer to mount a physically remote memory device such as a file server, residing on a server or peer computer, and execute the application program residing there. Typically, however, these capabilities of the operating system are only utilized within an institution where an umbrella of network management exercises control over both the clients and the servers to prevent corruption of data on the server side and configure the client computers to access the server-stored code.

SUMMARY OF THE INVENTION

The present invention concerns a third-party application hosting system.

The present invention concerns an application program delivery system utilizing a helper application.

The present invention concerns a technique for enabling conventional remote networking to be maintained through non-standard ports.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 6A-6C are flow diagrams showing the steps associated with the application monitoring process according to the present invention;

DETAILED DESCRIPTION OF THE PREFERRED EMBODIMENTS

Figure 1:
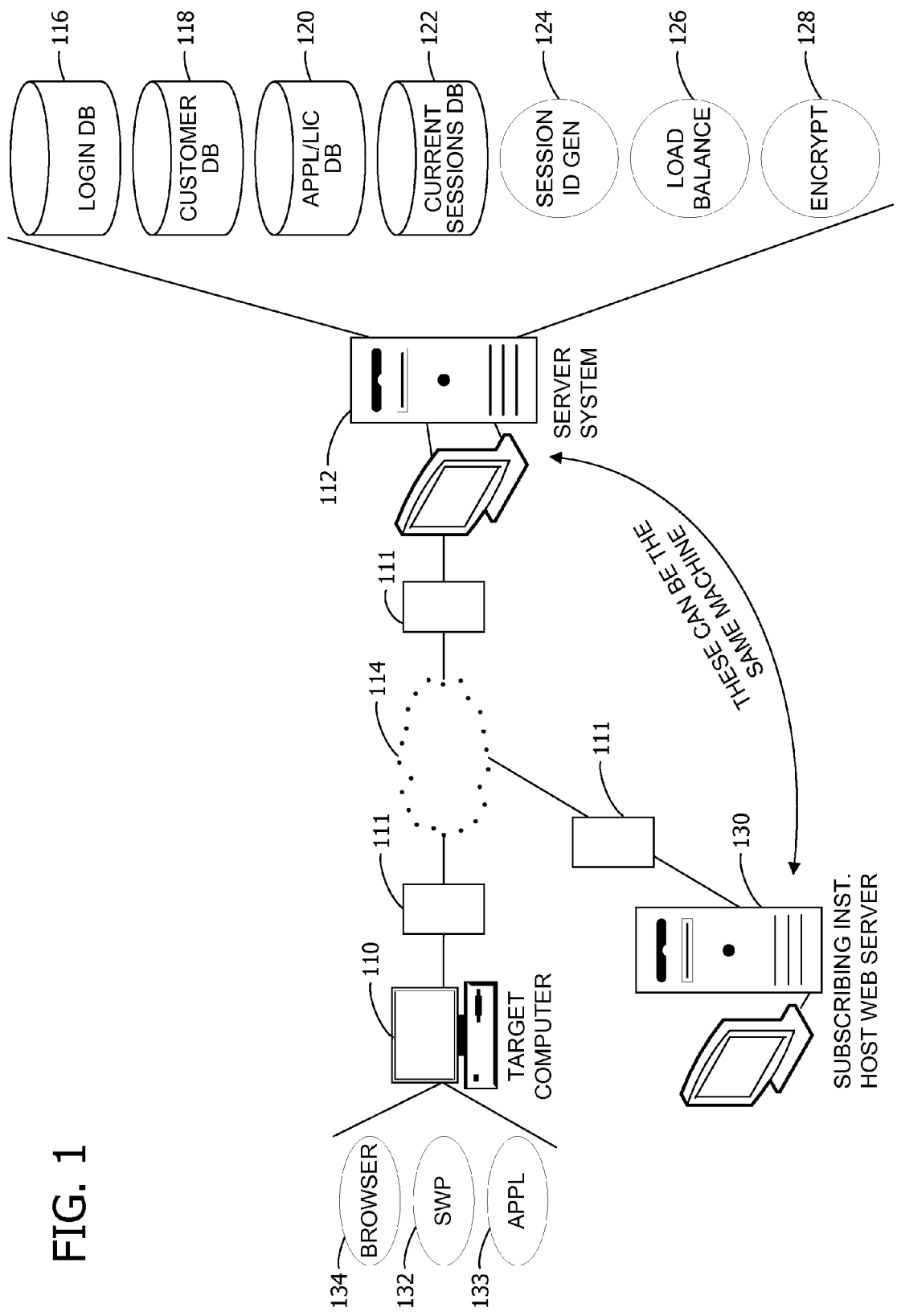
FIG. 1 is a schematic illustration showing the application serving system and specifically the interaction between the target client computer, the host Web server computer of the third-party subscribing institution, and the server system, according to the present invention.

FIG. 1 shows an application serving system 100, which has been constructed according to the principles of the present invention.

Generally, the application serving system 100 comprises the user, target client computer 110 that connects to a server system 112 and subscribing institution host Web Server 130, over a network 114.

Both client computer 110, Web server 130, and server system 112 implement a network protocol layer to communicate across the network. In a preferred embodiment, network 114 is the Internet, or other public or private network, and the network protocol layers are implemented on top of TCP/IP or UDP/IP. Other network configurations and network protocols layers, however, could be implemented in place or in addition to the Internet such as wireless CDPD, GPRS, or other networks.

The target, client computer 110 is a PC computer in one implementation. It operates a Microsoft Windows 95/98/NT/2000 operating system, on an Intel processor/IBM-compatible hardware platform. Other alternatives, however, are possible such as open source operating system platforms, such as Linux or Apple MAC OS's or other operating systems that provide an application programming interface (API) support for developers.

The target computer 110 preferably has preinstalled application programs. In the present implementation, a browser 134, such as the ubiquitous Netscape Navigator or Microsoft Explorer browsers is used. Additionally, the target computer 110 also preferably has a helper application or software player 132. Such preinstallation can be performed typically at a website hosted by the institution that operates the server system 112 or also the subscribing institution 130. The installation of the helper application can also be incorporated into the application serving process.

The subscribing institution, which maintains the host web server 130, can be a third party relative to the institution, which maintains the server system 112 in one anticipated business model. The subscribing institution has a requirement or desires to provide application programs to the user at the target computer 110, but, rather than providing this functionality itself, the subscribing institution outsources this to the institution operating the server system 112. The subscribing institution, however, typically has an Internet presence. Specifically, it will typically maintain a website/websites that offer the application programs to users From one implementation, the server system 112 is maintained by an institution that provides application programs to users as a paid service to subscribing institutions.

Depending on the institution managing the target computer, a firewall 111 may be present between the target computer and the network 114.

Specifically, the service institution's server system 112 maintains a user account/policy database 116, a customer policy database 118, an application configuration database 120, and a database of current sessions 122. The server system additionally executes a session ID generator 124, a load balancing process 126, and an encryption process 128.

Nonetheless, it should be appreciated that the technology of the present invention also has applicability to the business model where the server system 112 and host Web server 130 are maintained by the same institution, or may even be one and the same machine. In this context, the institution does not wish to out-source the work associated with the serving of the applications to the user at the target computer 112, but wishes to provide this functionality through in-house expertise.

Figure 2:
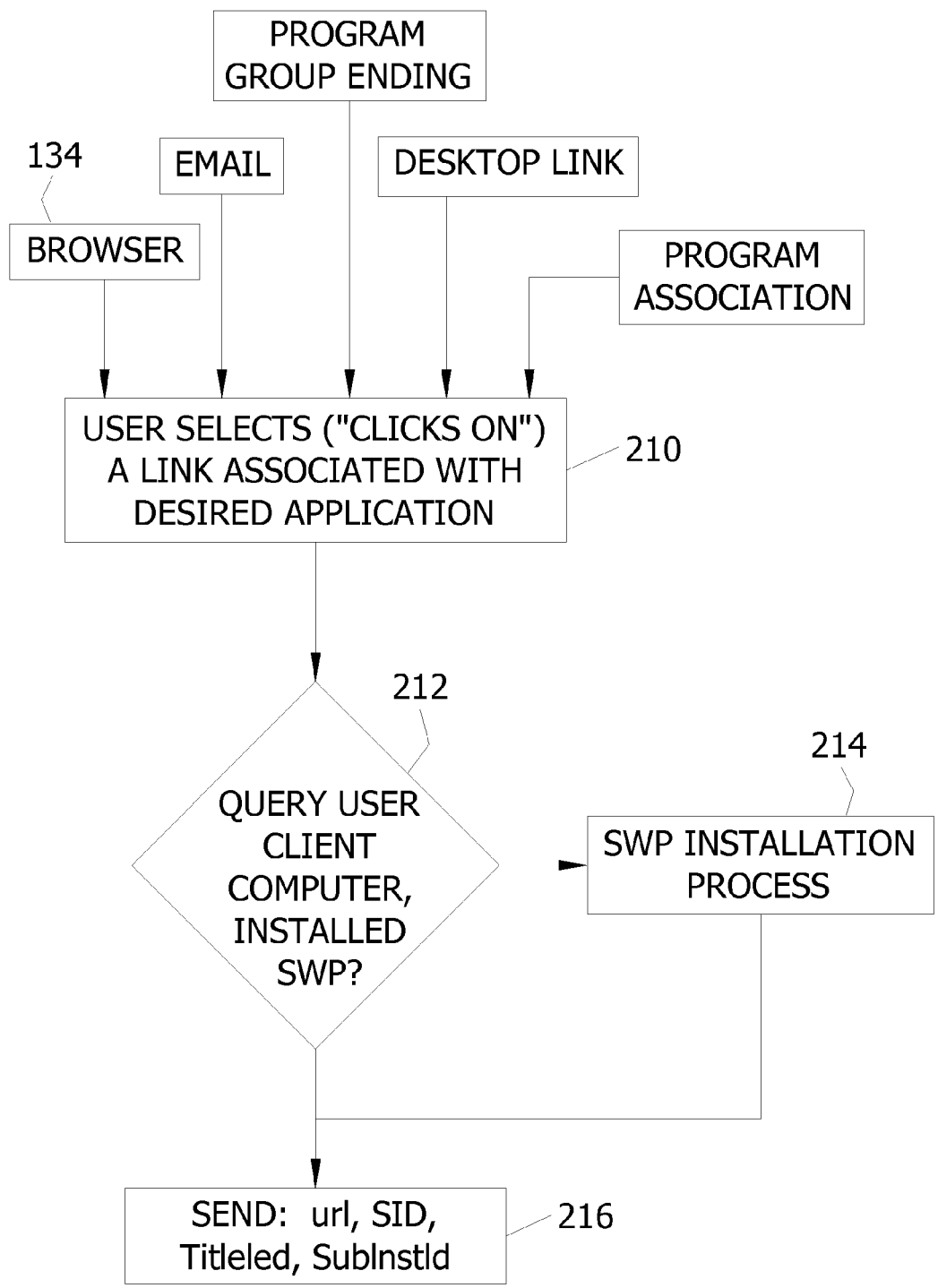
FIG. 2 is a flow diagram illustrating the method by which the serving of applications to the target computer is initiated at the third-party subscribing institution according to the present invention.

FIG. 2 shows the steps performed by or at the target computer 110 to initiate the serving of an application to the target computer. Specifically, a user at the target computer 110 identifies a desired application to the target computer 110 in step 210. In the typical case, the browser 134 is executing on the target computer 110 and a link is displayed in the browser window. This link is identified and/or associated with the application that the user desired to execute on the target computer 110. The user, operating a graphical pointing device, such as a mouse (not shown), controls the target computer's graphical user interface to select or "click-on" the link for the desired application.

Selection of the link in step 210 causes the browser 134 to interrogate the target computer's operating system to determine whether the appropriate software player (SWP) has been installed on the target computer in step 212. This interrogation is performed in one embodiment by an API call to check the operating system registry. Applets, ActiveX, or scripting, however, are other modalities for performing the interrogation.

If it is determined that the software player has not been installed on the target computer 110, an installation process is begun in step 214. In the typical implementation, this installation process comprises either pointing the browser, or a new instantiation of the browser, with a new universal resource locator, to website that supports the installation of the software player through a download, for example.

The install/download is made as simple as possible. A Java applet can be used that allows unattended installation—if permission is provided. Preferably, a download bar is displayed on the browser screen, and then, when the Player has installed, it automatically begins to launch the application that was initially requested by the user. In this way, the result to the user will remain launching the program asked for, not just installing the system The SID referred to in the SEND step 216 is a unique session ID that is specific to the link and the specific session. The SID is optionally used as an additional security token from the web site that identifies authentication has occurred for this specific session, which may be cached. This is important for the rental/subscription model where users with credit cards or user names and passwords are consistently authenticated. In addition, other unique identifiers can be used in additional embodiments to assist with identifying users, player components, or other system features or configurable items. These identifiers can be used throughout the system in the way identified here as well as others. Authentication is not intended to be made secure by this method; this can be done by other means such as cryptographic security, obfuscation, or other means, though the SID can be used as a nonce in protocols that use them, such as Kerberos.

Once there is an installed software player, the browser 134 is pointed with a URL to the server system 112, in step 216. The URL link contains: 1) a unique identifier associated by the server system 112 with the application requested (TitleId); 2) an optional unique user ID (SID) described above; and optionally 3) an identifier that identifies the subscribing institution (SubInstId), as well as other optional parameters. Typically, the subscribing institution is the company that operates the host Web server computer 130, which served the web page that originally contained the link associated with the application that was desired by the user of the target computer 110.

Figure 3:
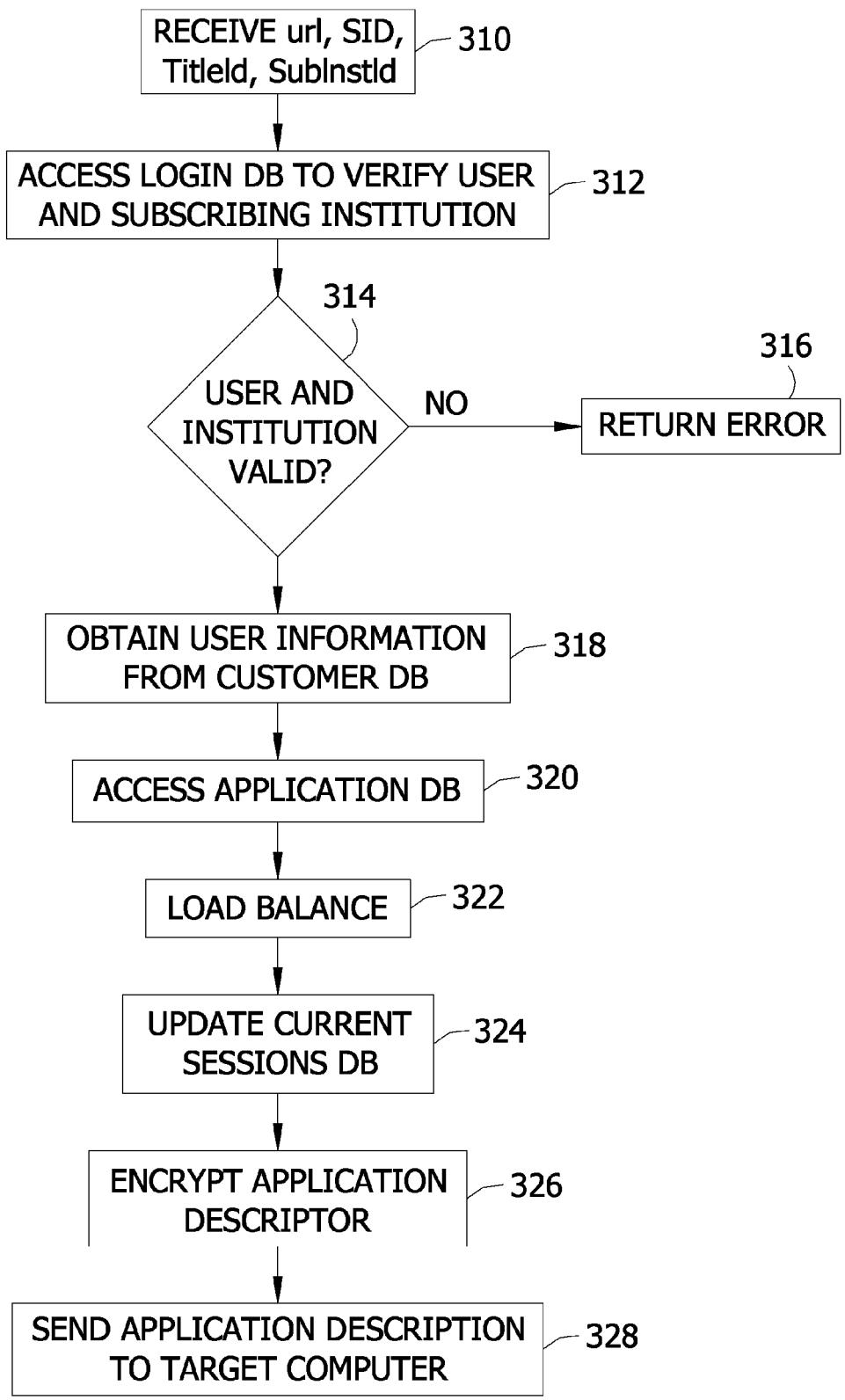
FIG. 3 is a flow diagram illustrating the steps performed by the server system when the target computer requests an application.

FIG. 3 shows the steps performed by the server system 112 when the target computer 110 requests an application by transmitting the URL containing the SID, TitleId, and SubInstId to the server system 112 over the network 114.

Specifically, in step 310, the server system 112 receives the URL, SID, TitleId, and SubInstId described with reference to FIG. 2. The server system then accesses the user database 116 to verify that: 1) the user at the target computer 110 is a valid user by reference to the subscriber Id field (SID) or through authentication with the system using standard AAA protocols such as NTLM, HTTP Basic, Kerberos, or other authentication means; and 2) the subscribing institution is a currently valid subscribing institution by reference to the SubInstId field in step 312. If either the user or subscribing institution is invalid (step 314), an error is returned to the target computer 110 in the step 316 by the server system 112.

If the user and subscribing institution are verified, the server system 112 then proceeds to construct an application descriptor or data file that will coordinate the operation of the target computer 110 and the server system 112 across the network 114. In present implementation, the application descriptor is a file that is named with a ".WOW" suffix or ".OSD". In the case of the ".WOW" suffixed file, its contents are plain text, but the file is registered with a MIME type of application/softwarewow so that the browser and helper applications may recognize it. In the case of the ".OSD" file, it is an XML file containing much the same description, but will be registered as type application/softricity. The ".OSD" file can also be pregenerated and used directly by the client application without the need for on-the-fly generation. In this case, the URL contained in the file will be used for authentication and connection establishment purposes only.

Specifically, referring again to FIG. 3 in step 318, the server system 112 accesses the customer database 118 to obtain configuration information regarding the session.

Next, in step 320, the application descriptor is accessed. This contains information concerning the application, which was requested by the user. For example, the application descriptor contains such information as minimum system requirements (RAM, processing power, etc.) that are required by the application on the target computer 110, the application media weight or processing requirements on the server system 112 associated with each instantiation. In addition, licensing and policy information is retrieved from the application database 120. This information is exchanged by the client and server in order to properly control the license and apply any dynamic policy/configuration changes.

Next, in step 322, the load balancing process 126 is optionally executed. The server system 112 selects a host computer within the server system that will be primarily responsible for serving the application over the network 114 to the target computer 110. In the typical embodiment, the server system comprises multiple host Web servers. The selected host computer is co-located with the other host computers in one implementation; alternatively, components or servers of the server system are located in a server farm and/or geographically local to the target computer 110. The load balancing process selects the host computer based on geographic proximity to reduce latency. As will be understood by those of skill in the art, the load balancing step can also be done later by an external load balancing system. Typically, load balancing checks the current session database 122 to determine which host server in the server system 112 has the least load. The list of servers serving the specific application is part of the title's application description. Determination of which server to use is based on the number of concurrent connections to each server and the media weight of each application and also the user's physical geographic location based on the IP address.

Next, the current sessions database 122 shown in FIG. 1 is updated in step 324 shown in FIG. 3 with the current session being added. Specifically, the session ID, the user's IP (internet protocol) address, the application title, the media weight, and the server assigned to the session is added as well as licensing information required to maintain proper license control. This license information can include the actual named license key if the software is used in that way, or it will use the session ID as a count for concurrent usage limits. Other licensing schemes are all controlled in this database. This database is also used by the load balancing process 126, and optionally by a watch dog process that watches the connections to each host server in the server system to verify that all connections are from authorized users.

In step 326, the application descriptor can be encrypted. Minimally, this application descriptor comprises the host address of the host computer of the server system 112, plus the remainder of the URL needed to access the desired application. Finally, the application descriptor is sent to the target computer 110 in step 328.

Figure 4:
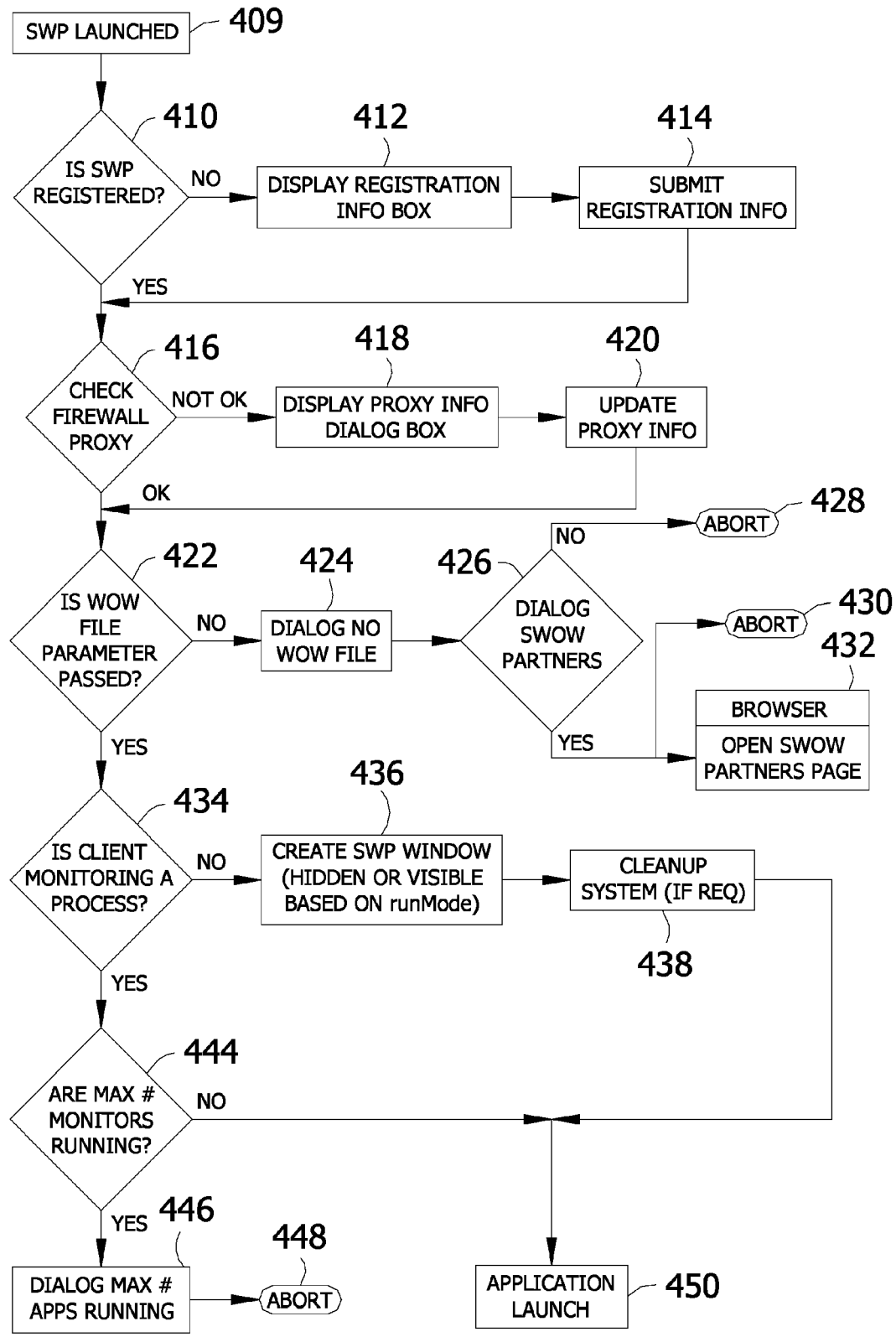
FIG. 4 is a flow diagram showing the launch process for the helper application, or software player, on the target client computer.

Referring now to FIG. 4 the launch process for the helper application or software player 132 is shown. Upon receiving the application descriptor file, the client launches the software player 132 in step 409. This is a helper application that completes the bulk of the client-side application management. In a preferred implementation, the receipt or selection (double-click) of the descriptor file automatically launches the software player. This is accomplished by configuration of MIME types during the software player's initial installation. In the Windows 95 operating system, MIME types are set in the registry, associating files with a specified suffix, here: WOW or OSD, prefix to be opened with the software player 132.

In step 410, the registration status of the software player 132 with respect to the server system 112, or institution operating the system, is determined. It may be required by the institution that each software player be uniquely registered within its database. If it has not been registered and/or properly licensed, a registration box is displayed on the graphical user interface of the target computer 110 in step 412. The user is either requested or required to complete the registration information box, depending on the implementation. Once completed, the registration information is sent, in step 414, to the server system 112 over network 114.

After registration, the status of any firewall proxy for firewall 111 is interrogated in step 416. If it is not valid, a proxy information dialog box is displayed in step 418, and the user is requested to complete it on the target computer 110. Once completed, the proxy information is updated in step 420.

Next, the status of the application descriptor is interrogated in step 422. If no application descriptor file is detected, a dialog is generated in step 424, on the target computer 110 for the user. The user is requested to enter a partner or subscribing institution. If it is determined that no institution has been entered in step 426, the process aborts. However, if a subscribing institution was entered, the process similarly aborts in step 430, but also points the browser 134 to the Web page for the subscribing institution in step 432. Next, at step 434, it is interrogated as to whether the client is monitoring a similar process, i.e., the software player 132 is currently running on the client. If it is not running, the SWP window is created in step 436. Depending on the run mode and the configuration of the SWP, the window is either hidden or visible on the client interface. In one embodiment, the SWP is never visible, or is only visible as a system tray icon on Microsoft Windows operating systems.

In step 438, any system setup and/or clean up is performed. Generally, the operating system registry is written to when applications 133 are run. In one embodiment, the software player tracks those modifications, and any registry changes; these changes are undone when the application 133 and software player 132 are quit. However, if the software player 132 was terminated unexpected during its last operation, the registry clean up may not have been perform. If not, the clean up occurs in this step. Specifically, any modified registry settings are returned, icons are removed, folders in any disk drive are removed, and any new copies of applications on desktop are removed. In a preferred embodiment, an Operating System Guard is used, such as that described in commonly assigned U.S. patent application Ser. No. 09/859,208 which was filed May 16, 2001 and incorporated herein by reference. The Operating System Guard can be loaded with an application's settings and guaranteed proper operation and cleanup. Next, the player is set up on the OS tray. If it is determined that the SWP is currently monitoring a process and thus invoked, in step 444, the status of the target computer operating system is interrogated in step 444. If too many applications are currently running, a dialog is generated notifying the user in step 446 and the process aborts in step 448. However, if there are sufficient resources to run the application, the new launch application process is started in step 450.

Figure 5A:
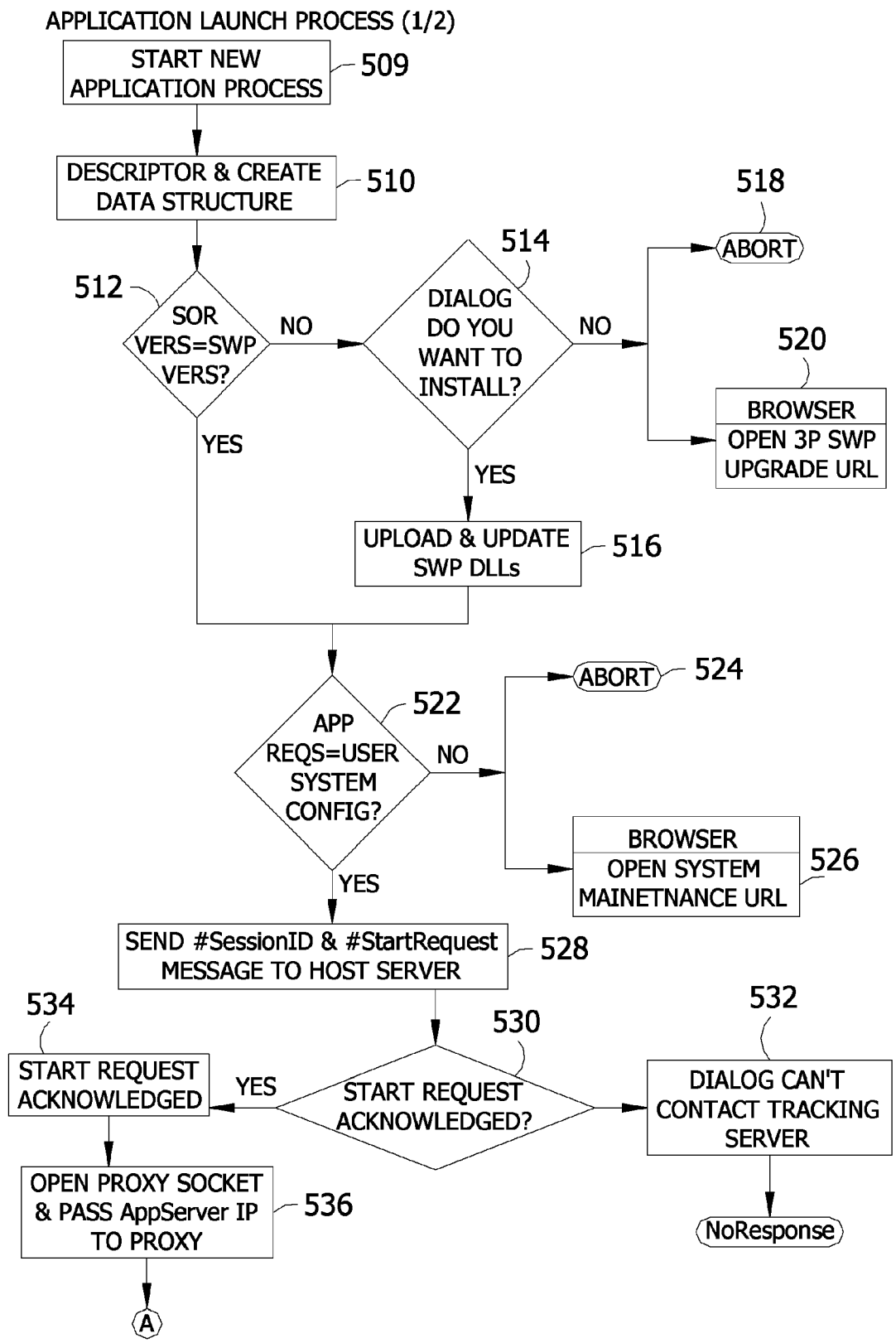
FIGS. 5A and 5B are flow diagrams showing the application launch process that is performed on the target client computer.
Figure 5B:
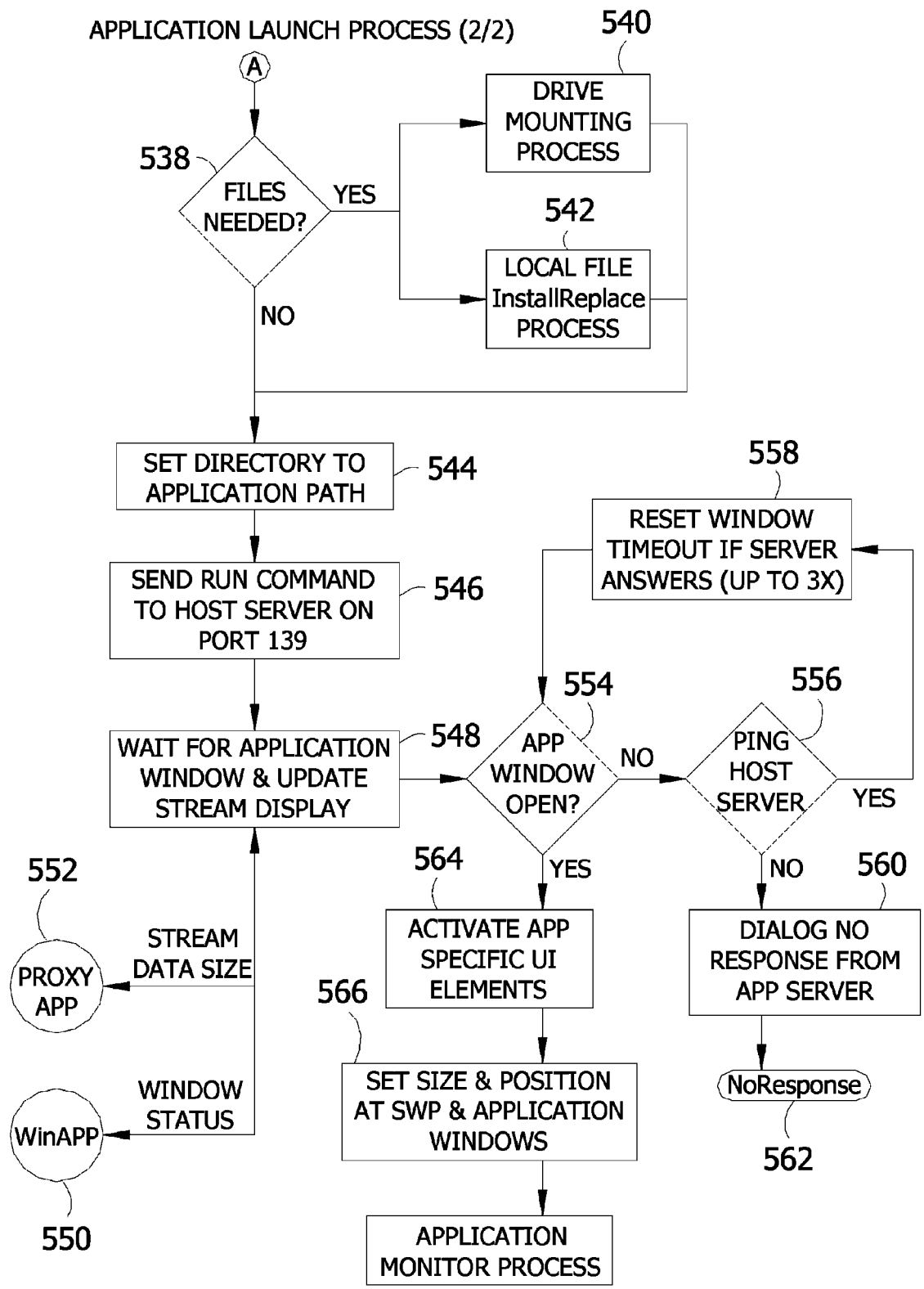

FIGS. 5A and 5B show the application launch process.

Specifically, the software player 132 reads and potentially decrypts the incoming application descriptor file. To read in the encrypted data, the application can utilize publicly available encryption schemes such as DES, or an internal private key system specific to the embodiment.

Once decrypted, the software player 132 checks to see if this is the first time it has been run on the client computer 110 by checking the computer's internal settings to see if a unique ID has been written to the settings. This is done on Windows by querying the Registry for a specified key. If it finds the unique ID, it continues. If it does not find a unique ID, it can ask the user for personal information that will be collected for a User Database in one implementation.

It then creates a data structure in step 510. The version of the application descriptor is then compared to the version of the software player 132 in step 512 to ensure compatibility. If there is an incompatibility or available upgrade, a dialog is displayed in step 514 asking the user if they wish to upgrade to a new software player or obtain the new components. If the user agrees to upgrade, the new components, dynamic link libraries (.DLL's) in one embodiment, are downloaded from the server system 112 in step 516. The software player unloads the current dynamic link libraries and updates the DLL's in step 516. In contrast, if the user chooses not to install the new software player in step 514, the process aborts in step 518 if the player will be unable to process the application, while simultaneously pointing the browser 134 to an upgrade URL hosted by the server system 112 or hosted by another server in step 520.

If the process is not aborted in step 518, the application requirements contained in the application description are compared to the target computer's configuration in step 522. If there are inadequate resources, the process aborts in step 524. Additionally, the browser 134 is pointed toward a web page hosted by the server system providing for maintenance. Specifically, the maintenance URL is passed to the browser in step 526. For example, a minimum or maximum screen depth, resolution, RAM requirements, processor requirements, sound board requirements, and video board requirements are assessed. These checks are made by querying the necessary API for the operating system in question. If the resources are inadequate, the error which is generated can be displayed to the user, or alternately transmitted to the server, whereas the server may be connected to the hosting institution's CRM or help desk application to which the error is forwarded, and potentially the user automatically connected.

If the user system's resources are determined to be adequate in step 522, a message is sent from the target client computer 110 to the server system over the network 114 in step 528. The message contains the session ID, which was received from the server system in the application descriptor file. Also, a start request message is sent to the server system. The receipt of the session ID identifies the session and implicitly notifies the server system 112 that the target computer has successfully opened the application descriptor file, which had been previously sent. The start request 530 indicates that the target client computer is now ready to begin to execute the requested application. At this time, the client and server can setup network resources, dynamically configuring to penetrate firewalls, and exchange any further needed information about the connection or process.

Also, the software player 132 also preferably determines, via the application descriptor or through exchange with the server, the transaction or licensing mode being used. This can impact the appearance of the player 134 on the screen or GUI of the computer 110 in one embodiment. For example, if the application descriptor says it is an advertisement-based transaction, then the software player 132 will respond by positioning itself at the top level of the screen depth and begin to request advertisements from an advertisement server over the network. Conversely, if the application descriptor says it is a subscription-based, the software player 132 will hide itself, but continue to work in the background. The ads are most commonly obtained through HTTP calls to a networked ad server. If the client receives notification of a need for a license, it will communicate again with the server to obtain and set the license on behalf of the client.

In step 530, the target client computer 112 then waits for a start request acknowledgment from the server system 112. If no acknowledgment is received after a predetermined time period, a dialog is displayed on the target client computer 110 to notify the user that the server system is currently unavailable in step 532.

If the start request is acknowledged in step 534 by the server system 112, a proxy socket is optionally opened in the target computer 110 and the application server address is passed to the proxy in step 536. If the proxy application is integral to the SWP, the data is passed through a function call or other data structure.

Referring now to FIG. 5B in step 538, the software player 132 attempts to create a virtual environment on the target computer simulating that of the application when it is correctly installed. The player first determines if any files are required from the server system 112 to initiate the launch process. If files are required, they can be obtained by initiating a drive mounting process in step 540. Alternatively, the files can be obtained using a local file installation and replace process in step 542. Additionally, both processes could be used if multiple files are required. In the preferred embodiment, files are not installed or replaced on the target computer. At first, the virtual environment will install a symbolic link in lieu of the file. At the time the file is needed, it is serviced by the remote server or from a local file cache.

Certain applications require specific files at specific locations. For example, certain anti-virus programs require virus definitions to exist at specific path. Such hard coded path requirements are addressed in this initial configuration check. A file check is performed and any required files are installed in the manner listed above. If necessary, all or part of the file can be transmitted to the client computer before the application is launched.

With the above process, the target client computer 110 now has access to the files and specifically the code required to invoke the selected application. Next, in step 544, the directory is set to the drive and path of the application and the run command is issued to the host server.

In one embodiment, standard Windows remote networking methods are used to attach to the server's directory using the available Windows Networking API. This will invoke a series of SMB messages over NetBIOS and TCP/IP. If the client computer is running the Windows 95-version operating system, there is an additional step taken here. Since Windows 95 computers need to have the name of the server they are attaching to in a file in the Windows directory called LMHOST; the software player 132 writes the name of the server to the LMHOST file using standard file I/O techniques. In a preferred embodiment, the client can attach a local hardware facility to the remote server, allowing the application to appear local, whereas the client/server communication can be done using any networking protocol agreed upon. The local client computer will function with a simulated local memory device, or hard drive, with a remote connection to the server's own application container. The server can then transmit, or stream, needed bits of the application's files and configuration to the client's local memory.

The software player 132 then waits for the application window and the update of the stream display. The window status is acquired by reference to the operating system application programming interface. In a preferred embodiment, where it is operating on a Windows OS platform, the window status is obtained via the Windows API in step 550. The stream data size is obtained from the proxy application in step 552. In step 554, it is interrogated as to whether or not the application window has opened. Until the window opens, the host server in the server system 112 is periodically pinged. The window timeout is reset as many as three times and as long as the server is responsive to the ping in step 558. If there is no server response to the ping as determined in step 556, the user is notified via the dialog in step 560 and the program aborts in step 562. If, however, the window opens as determined in step 554, the user interface elements are activated which are specific to the application in step 564. The size and position of the software player and application windows can then be set in step 566. At this stage, with the application running on the operating system of the target client computer 110, the process proceeds to an application monitoring in step 568.

Figure 6A:
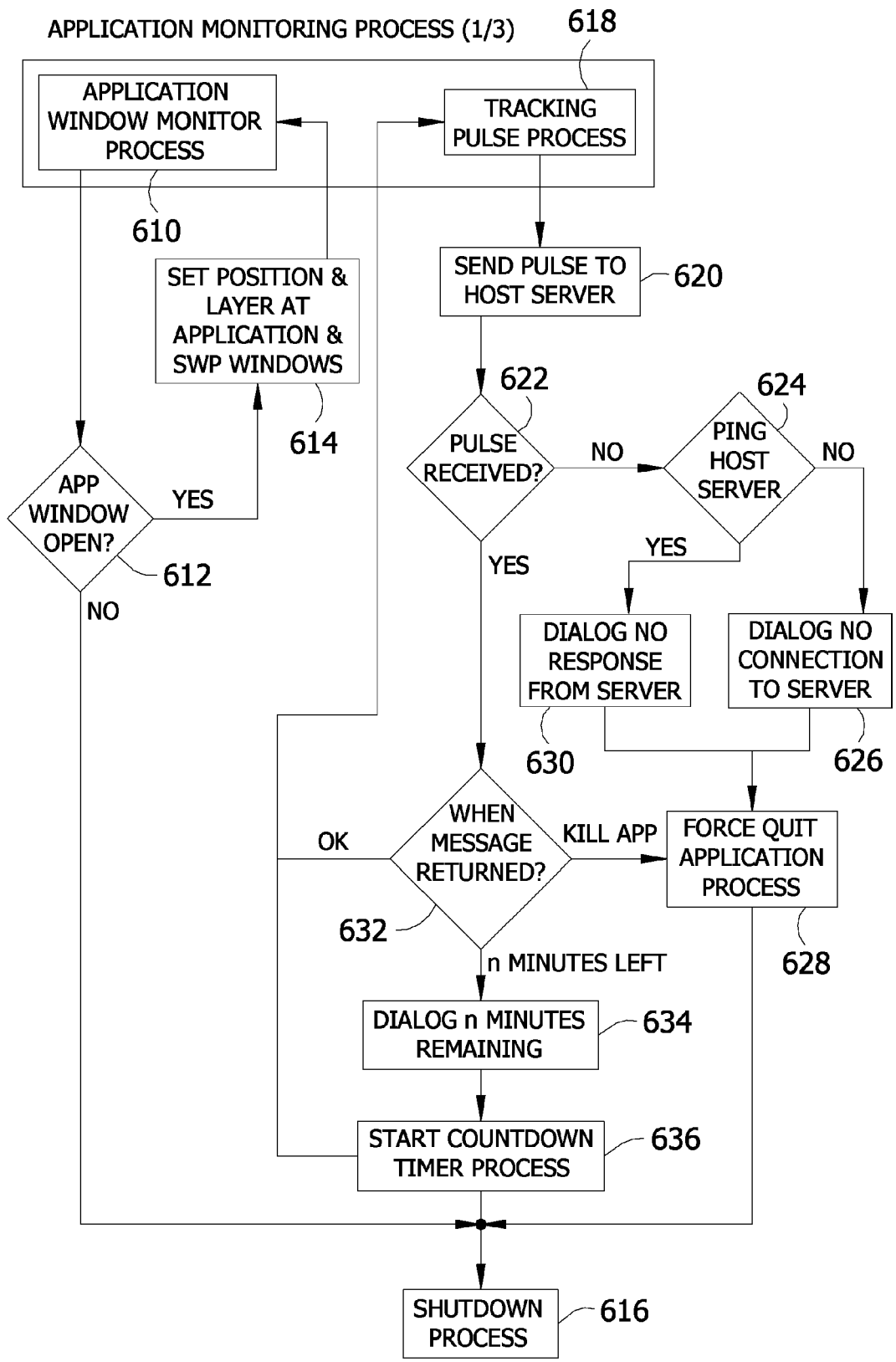

In a preferred embodiment of the present invention, there are six processes that are performed to monitor the application: application window/process monitoring, tracking pulse monitoring, advertising updating, net traffic monitoring, countdown timing, and user event handling. FIG. 6A illustrates the steps associated with application window/process monitor process and the tracking pulse process. Specifically, while the selected application is executing, the client computer multitasks to also monitor the operation of the application. One of the processes is the application window/process monitor process 610. Specifically, the application monitor process 610 periodically makes API calls to determine whether or not the application's window is still open in step 612, and if the application has spawned any child processes. If the window is open or the cild process is still functioning, it can maintain and/or set the position and layer of the windows of the application 133 and the software player 132 with respect to each other in step 614 according to the transaction mode. However, if the application monitor process 610 determines that the application window has closed, the software player 132 begins the execution of a shutdown process 616.

The tracking pulse process 618 periodically sends a pulse or a ping to the host server of the server system 112 in step 620. If it is determined that no pulse has been received in step 622, the target client computer 110 pings the host server of the server system in step 624. Based on the status of the ping, if it is determined that there is no connection to the server, the client will attempt to re-establish communications and its session with the server. If the re-establishment is unsuccessful, the client may reattempt to establish its session with another server. If none of these attempts are successful, a dialog is generated in step 626 and there is a forced shutdown of the application process in step 628, and again, the shutdown process is activated 616. If the ping is successfully sent to the server, but no response is received, a dialog is generated in step 628. Again, a "no response" dialog is generated in step 630 and the shut down process is activated in step 616.

In other implementations, tracking is not provided by sending pulses; instead, the application server monitors socket connections to determine if the user is still connected. From the client side, instead of the server telling the client to shut down, the client gets its "total time to run" as part of the descriptor file and authorization process and begins counting down—and eventually shuts down—once it hits zero time. Additionally, in this implementation, the client can re-authorize to obtain more time from the server to reset the countdown time. Any time returned by the server is added to the currently remaining run time held by the client. In contrast, if it is determined that the pulse is received in step 622, the message is analyzed. If it is determined that the message is to turn off the application in step 632, the application process is terminated in step 628 and the shut down process is activated, step 616. It the message returned that the application must be terminated within n minutes, a dialog is generated in step 634, notifying the user of the remaining minutes of access to the application. A countdown timer is started in step 636. Finally, if the message returned is an all clear or "OK" message in step 632, the process returns.

FIG. 6B shows the ad update process, net traffic monitoring process, and countdown timer process, which are additionally performed as part of the application monitoring. Specifically, the ad update process periodically updates the ads displayed on the software player and any URL's required for the ad server in step 640. It then returns to the run mode of the ad process in step 642. If the transaction mode is advertisement-based, the software player will maintain a +1 depth relationship with the application's window. This means that if the application 133 is brought to the front, the software player 132 will place itself in front of the application 133 so the application cannot hide the advertisements being served. If a different application or window, i.e., one not being hosted by the server system 112, is brought to the front, the software player 132 will not obscure the application or window. It will maintain its +1 depth relation to the application 133. This is accomplished by use of the Windows API. Also, the player is monitored so that it is not moved off the screen.

Step 644 monitors network activity and notifies the net traffic monitoring process in step 646. This allows the application monitor to determine if there are any problems associated with high traffic, which would impact the operation of the application. This is potentially useful as feedback or input to the network transmission layer for maintenance of quality of service for the application. In step 648, the display countdown timer is updated. This countdown timer notifies the user as to the time remaining in which the application is available. This is most relevant where the user has, for example, "rented" the application for a fixed period of time as indicated by the transaction mode. The countdown timer updates the countdown timer process 650 so that a shut down process is automatically activated when the timer has timed-out.

Figure 6C:
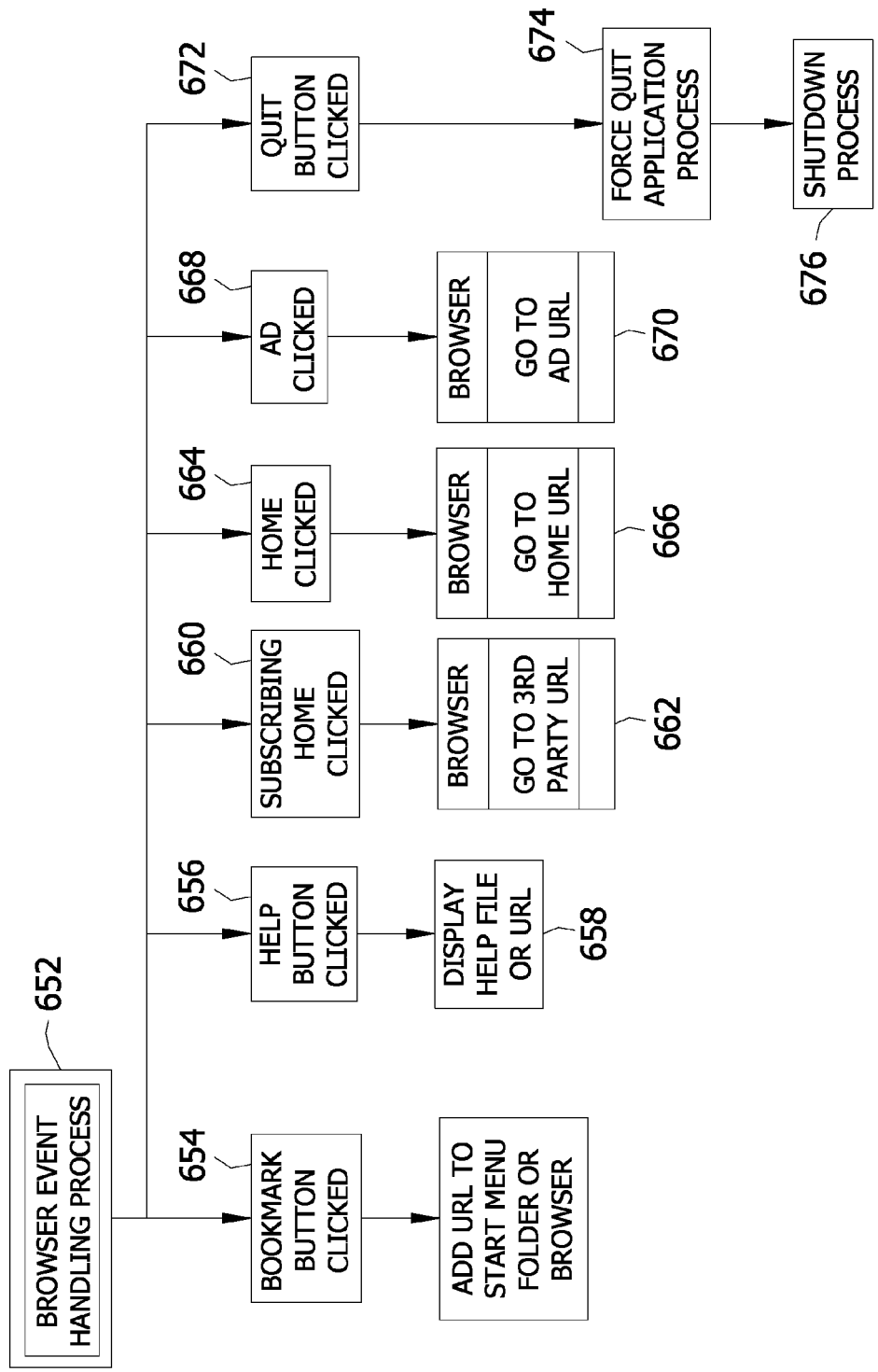

FIG. 6C illustrates the event handling process 652 of the application monitoring processes. Specifically, if the bookmark is selected in step 654, the URL of the third-party application hosting institution and its server system 112 is added to the start menu folder of the browser 132.

Currently, the bookmarking feature is termed "Quick Launch"—instead of adding it to the start menu folder system, it gets book-marked as part of a screen in the player—the one that comes up if you click on Quick Launch. It remembers the location from where you initially clicked, thus guaranteeing the web site that they will still get ad revenue and a follow-up page each time the user clicks on the Quick Launch bookmark.

If the help button is selected in step 656, a help file is displayed. The browser 134 is pointed to a URL of a help file server in step 658. If the third party home is selected in step 660, the browser is pointed to the URL or a specified URL of the subscribing institution in step 662. If the home button is selected in step 664, the browser 134 is pointed to the home page of the third-party application hosting system in step 666. If the advertisement is selected in step 668, the browser is pointed to the URL of the advertising company in step 670. Finally, if the quit button is selected in step 672, the application is forced to terminate in step 674 and the shutdown process is started in step 676.

Figure 7:
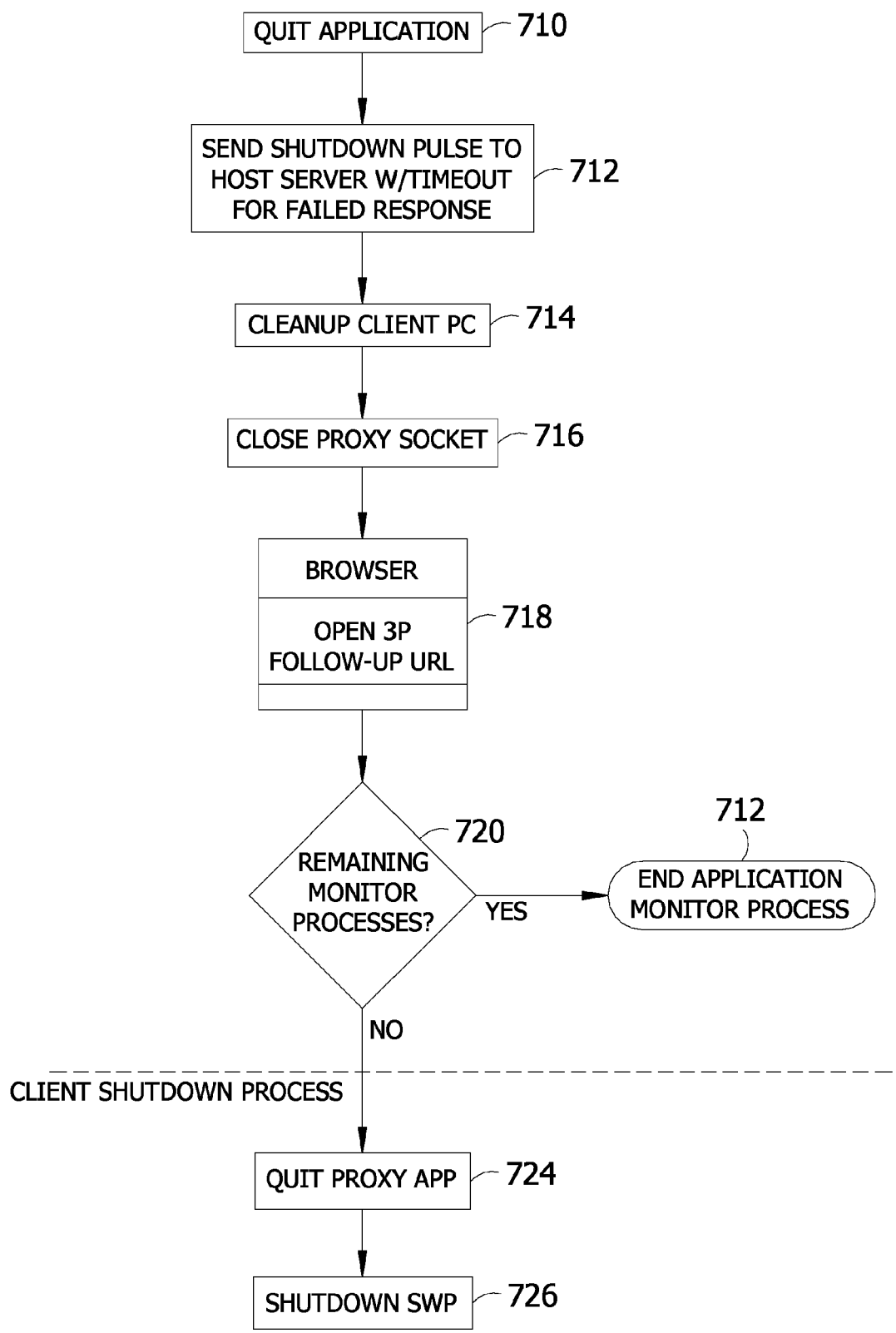
FIG. 7 is a flow diagram illustrating the application shutdown process according to the present invention.

FIG. 7 is a flow diagram illustrating the application shutdown process. Specifically, if the application 133 is desired to be shutdown or quit in step 710, a shutdown pulse or signal is sent from the client computer 110 to the host server of the server system 112 in step 712. Any remnants of the application program are then removed from the operating system 135. In the preferred embodiment, the use of the virtual environment will automatically clean and potentially persist any modified registry settings. Icons are removed, folders or files in any disk drive are removed whether a link or through a file copy, and any new copies of applications on the desktop are removed. Next, the player 132 is set up on the OS tray.

Finally, in one embodiment, a follow-up URL can be sent to the browser 134 in step 718. In this embodiment, this follow-up URL is for the subscribing institution and typically hosted by the web server 130, allowing it to follow with a "sales pitch" or to solicit for further purchase of services. This allows, in some implementations, the third-party application hosting to be transparent to the user at the target computer. Finally, any remaining monitoring processes are identified in step 720, and the monitoring processes are terminated in step 722. In step 724, the proxy application is quit and the software player is shut down in step 726.

Finally in certain embodiments, a port proxy application is started prior to the application launch process. Generally, the port proxy application is required because of two factors. First, one embodiment of the present invention utilizes standard Microsoft Windows 95/98/NT/2000 operating system networking protocol implementation of SMB (server message block). This standard protocol operates over port 139. However, since it is a sharing protocol, it is deemed dangerous or non-secure, and communications through this port are blocked by many commercial, government, corporate firewalls. Second, the preferred embodiment and all other possible embodiments observe the same issues in attempting to traverse corporate firewalls. Most ports are blocked for client/server communication, and ways must be found to interoperate through the firewall.

Figure 8:
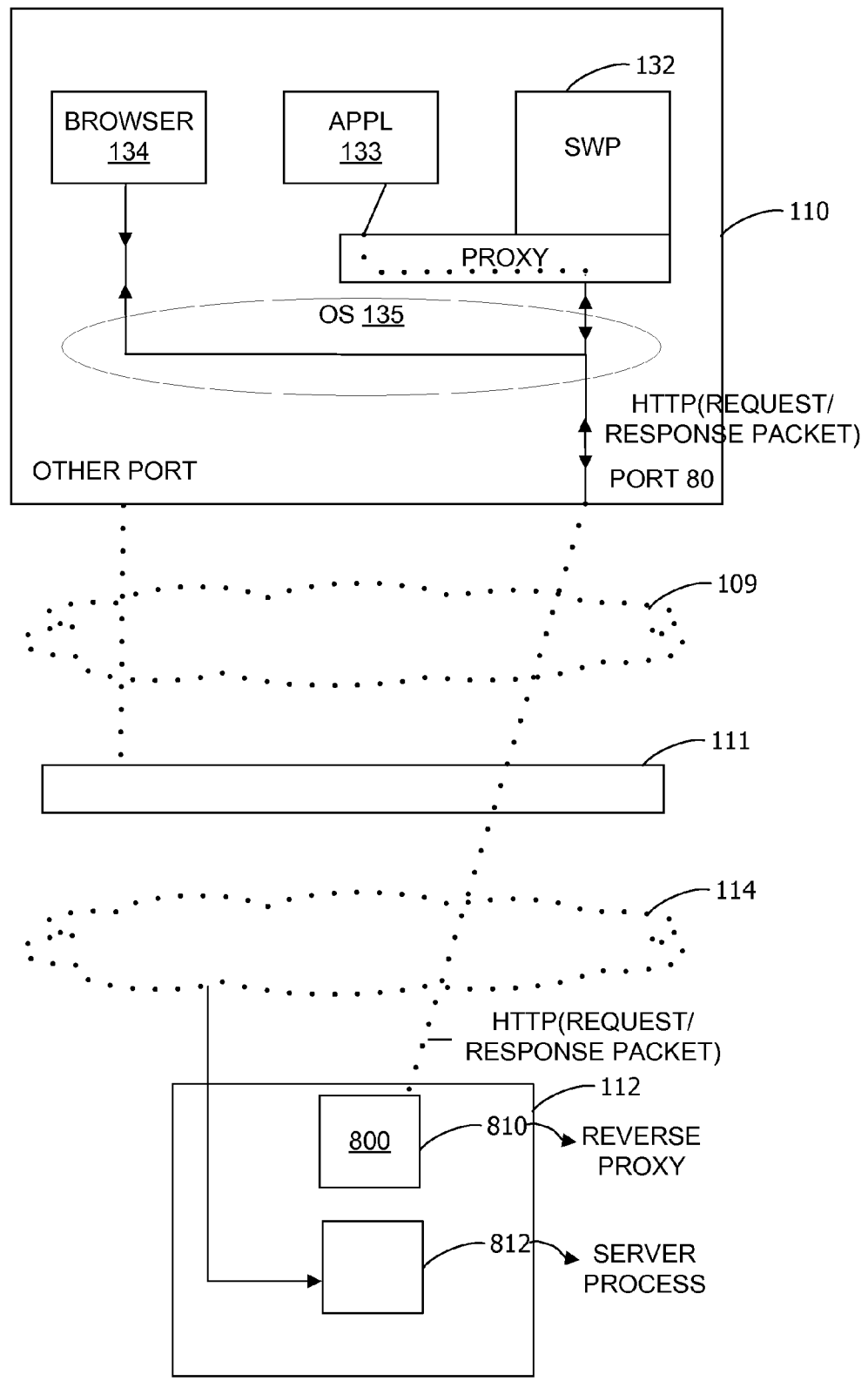
FIG. 8 is a block/communication stack diagram illustrating the operation of the port proxy application according to the present invention.

FIG. 8 illustrates the operation of the port proxy of the software player 132. According to the present invention, when the application 133, through the software player, makes request to server system 112, the request is directed to the server for communication by the application. The proxy intercepts this communication. The request is redirected, by the proxy, through port 80, which is the HTTP, or web port, or alternately through a port identified as open or able to proxied by a present proxy server. In an alternate embodiment, this proxy application can be present inside the SWP or in the application communicating with the server, negating the needed for redirection, instead directly communicating over an alternate port. When used over HTTP, this method is called HTTP tunneling.

Generally port 80 is not blocked either at the client level by modifications to the client operating system 135 or by the firewall 111 as most other ports are typically blocked. The port proxy allows to the application 133 to execute as if it were mounting a standard server using its native protocol. Communications, however, are actually occurring over port 80 of the client computer 110.

The use of the port proxy and port 80 communications requires that the operating system of the host server in the server system is non-standard. In one implementation, the server code has been recompiled to support SMB communications over port 80 instead of port 139. In the preferred embodiment, the server will support connections on static as well as dynamically negotiated ports, including port 80. This dynamic negotiation is done on a per session basis.

One further fix-up is required to ensure that communications are supported through port 80. Some firewall systems 111 monitor all traffic on ports. Some of these proxies will block any non-HTTP traffic on port 80. According to the invention, the client/server communications are encapsulated in HTTP packets by adding an HTTP header. In summary, the standard communications are converted to the HTTP protocol by the port proxy before being passed to the operating system 135 at the client 110. As a result, communications from the client, through the client's local area network 109, will pass through existing firewall systems 111 to the Internet 114. In an additional configuration, the HTTP connection can use advanced encoding modes to stream communications from client to server, eliminating the need to constantly regenerate header packets, thereby reducing network overhead and latency. Alternatively, the proxy application on the client can reroute traffic through port 23 (FTP) with the server returning on port 21, also reserved for FTP transfer, in another embodiment, if those ports are open, or through any available set of ports.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-implemented method for serving an application over a network, the method comprising:
    receiving on a server computer a first request having a session identifier and a requested application identifier corresponding to the application, wherein the application is designed to run directly on an operating system;
    accessing using the server computer a user database to authenticate the first request associated with the session identifier;
    accessing using the server computer an application database to determine characteristics of the application based on the received application identifier;
    selecting using the server computer a host to serve the application at least partially based on the determined characteristics of the application wherein said host sends an application descriptor to a client computer and a subset of instructions of the application to the client computer for execution, wherein the application descriptor includes an identity of the host.

2. The method as recited in claim 1 wherein the server and the computer and the selected host are the same computing system.

3. The method as recited in claim 1 wherein the act of authenticating comprises verifying that a subscribing institution is valid.

4. The method as recited in claim 1 wherein the act of determining characteristics of the application comprises determining minimum system requirements that are required by the application on a target computer.

5. The method as recited in claim 1 wherein the host is selected from a plurality of host servers in which the selected host server is geographically proximate to the client computer.

6. The method as recited in claim 1 wherein the client computer and the host computer maintains a connection while the application executes on the client computer.

7. The method as recited in claim 1 wherein the host is selected from a host controlled by the subscribing institution.

8. The method as recited in claim 1 wherein the client computer is provided with a total time available for use of the application.

9. A computer-readable medium having stored thereon computer readable instructions for serving an application over a network, upon execution on a computing device, the instructions causing the following actions:
    receiving on a server computer a first request having a session identifier and a requested application identifier corresponding to the application, wherein the application is designed to run directly on an operating system;
    accessing a user database to authenticate the first request associated with the session identifier;
    accessing an application database to determine characteristics of the application based on the received application identifier;
    selecting a host to serve the application at least partially based on the determined characteristics of the application wherein said host sends an application descriptor to a client computer and a subset of instructions of the application to the client computer for execution, wherein the application descriptor includes an identity of the host.

10. The computer-readable medium as recited in claim 9 wherein the server performs the actions of the host without selecting a host.

11. The computer-readable medium as recited in claim 9 wherein the act of authenticating comprises verifying that a subscribing institution is valid.

12. The computer-readable medium as recited in claim 9 wherein the act of determining characteristics of the application comprises determining minimum system requirements that are required by the application on the target computer.

13. The computer-readable medium as recited in claim 9 wherein the host is selected from a plurality of host servers in which the selection of the host is based on geographic proximity to the client computer.

14. The computer-readable medium as recited in claim 9 wherein the client computer and the host computer maintains a connection while the application executes on the client computer.

15. The computer-readable medium as recited in claim 9 wherein the host is selected from a host controlled by the subscribing institution.

16. The computer-readable medium as recited in claim 9 wherein the client computer is provided with a total time available for use of the application.

* * * * *